April 27, 1943. W. A. BRUNO 2,317,729
MEANS FOR EFFECTING DETACHABLE COUPLING OF TUBULAR ELEMENTS
Filed July 14, 1942
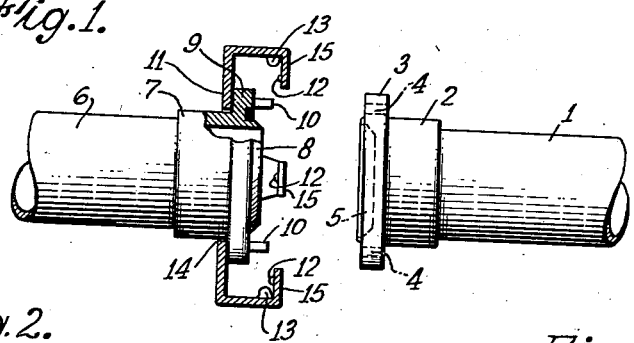
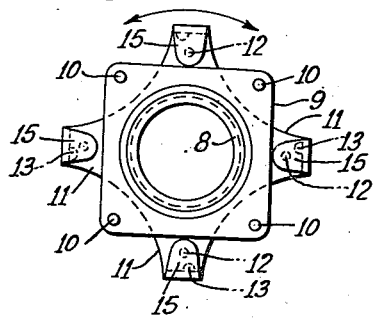
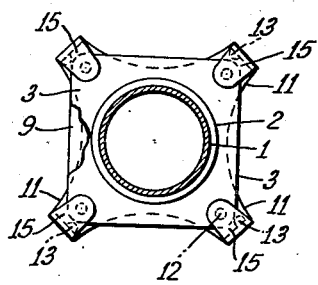
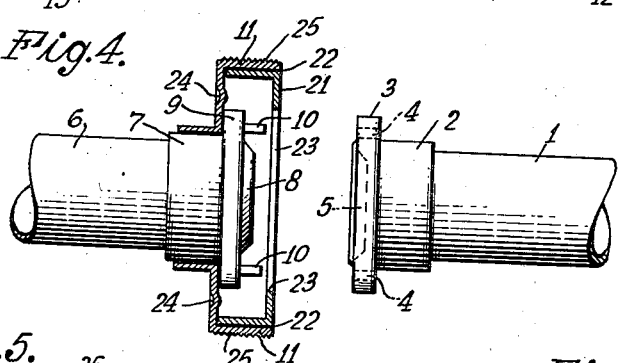
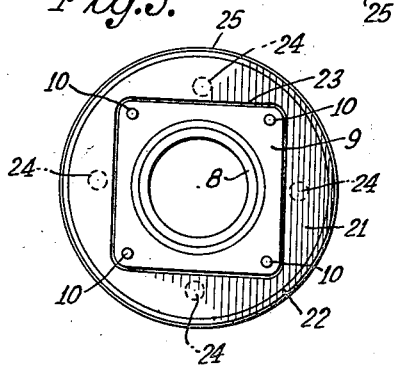
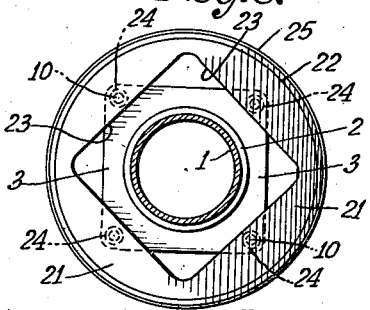
INVENTOR
WILLIAM A. BRUNO
BY
ATTORNEY Patented Apr. 27, 1943

2,317,729

UNITED STATES PATENT OFFICE 2,317,729

MEANS FOR EFFECTING DETACHABLE COUPLING OF TUBULAR ELEMENTS

William A. Bruno, Astoria, Long Island, N. Y., assignor to the firm Bruno Patents, Inc., Long Island City, N. Y.

Application July 14, 1942, Serial No. 450,857

5 Claims. (Cl. 285—180)

This invention relates to means for effecting rapid, detachable coupling of tubular elements, and has particular relation to means for coupling tubular elements provided with registering end pieces, and registering non-circular flanged members arranged on said end pieces.

The main object of this invention is to provide a coupling means or connecter which is adapted to easily and quickly establish a detachable connection between tubular elements such as a tubular section of an equipment to be tested and a tubular element of a measuring equipment, for example.

Other objects and the advantages of this invention will be understood from the following specification and claims, and the appended drawing which illustrates, by way of example, several embodiments of the invention, and in which Fig. 1 illustrates diagrammatically the tubular sections to be connected and a coupling means according to this invention;

Figs. 2 and 3 are end views of the tubular element and coupling means shown in Figure 1;

Fig. 4 illustrates diagrammatically a preferred embodiment of the invention, and Figs. 5 and 6 are end views of the tubular element and coupling means shown in Fig. 4.

Referring now to Figures 1 and 2, I represents a cylindrical section of an equipment to be tested, for example an outer conductor section of a high-frequency co-axial cable, or another high-frequency tubular conductor section. 2 is the cylindrical end piece of conductor section 1, provided with a tapering portion 5. A non-circular, preferably square shaped, loose, flanged member 3, which has a circular orifice and is rotatably arranged on said end piece, is provided at the end of piece 2. Flanged member 3 is also provided with holes 4 adapted to receive locating pins 10 at one end, and snap indentations 12 at the other end.

Cylindrical element 6 of the measuring equipment (not shown in the drawing) is provided with a cylindrical end piece 7. This end piece has a tapering end portion 8 registering with tapering portion 5 of end piece 2. A preferably square shaped flanged member 9 provided with a circular orifice, is secured to end piece 7. Flanged member 9 is provided with locating pins 10 which fit into holes 4 of flanged member 3.

A coupling member 11 is also rotatably arranged on end piece 7. This coupling member 11 has a central circular orifice 14, and four turned down corner portions 15, forming four U-shaped portions with the coupling member and being provided with snap indentations 12. Coupling member 11 is also provided with projections 13 which are adapted to limit the rotation of the coupling member.

In order to connect element 6 of the testing equipment with element 1, flanged members 3 and 9 are first assembled by applying member 3 to member 9, locating pins 10 being hereby introduced into holes 4, and tapering portion 8 being introduced into the registering portion 5 of member 2, coupling member 11 being then in the position shown in Fig. 2. Upon assembling members 3 and 9, coupling member 11 is turned to the right until snap indentations 12 are aligned with holes 4 and engage said holes. In this position, the measuring equipment, through cylindrical part 6 and the elements connected therewith, has a safe electrical, mechanical and gaseous connection with the equipment to be tested.

In the preferred embodiment illustrated in Figures 4–6, the tubular members to be connected and their end pieces are substantially similar to those shown in Figures 1 to 3. Coupling member 11 consists of a short flanged sleeve rotatably arranged on end piece 7. This coupling member is provided with a cap 21, soldered to coupling member 11 at 22, and provided with a square shaped orifice 23, permitting square shaped flanged members 3 and 9 to be assembled. Coupling member 11 is provided with resilient indentations 24 and knurled at 25. In order to connect tubular sections 1 and 6, the rotatable square shaped flanged member 3 and square shaped flanged member 9, secured to end piece 7 are assembled, whereupon coupling member 11 is turned to the position shown in Fig. 6. In this position, the flanged members of the tubular elements to be connected are clamped together by the coupling member between indentations 24 and cap 21, and the tubular elements form a safe electrical mechanical and gaseous connection.

It is to be understood that my invention is not limited to the specific embodiments presented herein for illustration and is susceptible of numerous modifications within the scope and spirit of the invention as defined in the appended claims.

I claim:

1. In a means for effecting detachable coupling of tubular elements provided with registering tubular end pieces, and registering non-circular flanged members arranged on said tubular end pieces, a coupling member rotatably arranged on one of said tubular end pieces, said rotatable coupling member being provided with indentations arranged in a design corresponding to the non-circular shape of said flanged members, and adapted to clamp together the assembled flanged members and end pieces upon rotating said coupling member to a position, in which one of said flanged members is engaged by said indentations.

2. In a means for effecting detachable coupling of tubular elements provided with registering end pieces, and registering non-circular flanged members arranged on said end pieces, a non-circular coupling member provided with turned down corner portions, rotatably arranged on one of said end pieces, provided with resilient indentations, and adapted to couple the assembled flanged members and end pieces upon rotating said coupling member to a position, in which said flanged members are clamped together by said indentations.

3. In a means for effecting detachable coupling of tubular elements provided with registering end pieces, and registering non-circular flanged members arranged on said end pieces, a non-circular coupling member provided with turned down corner portions, rotatably arranged on one of said end pieces, provided with projections adapted to limit the rotation of the coupling member, and with resilient indentations, said member being adapted to couple the assembled flanged members and end pieces upon rotating said coupling member to a position, in which said flanged members are clamped together by said indentations.

4. In a means for effecting detachable coupling of tubular elements provided with registering end pieces, and registering non-circular flanged members arranged on said end pieces, a cylindrical coupling member provided with a front and a rear surface, said coupling member being rotatably arranged on one of said end pieces, provided on its rear surface with resilient indentations, and adapted to couple the assembled flanged members and end pieces upon rotating said coupling member to a position, in which said flanged members are clamped together by the front surface of the coupling member and the indentations of the rear surface.

5. In a means for effecting detachable coupling of tubular elements provided with registering end pieces, and registering non-circular flanged members arranged on said end pieces, a cylindrical coupling member having a rear surface provided with resilient indentations, and a front surface provided with an orifice registering with said non-circular flanged members, said coupling member being rotatably arranged on one of said end pieces, and adapted to couple the assembled flanged members and end pieces upon rotating said coupling member to a position, in which said flanged members are clamped between the front surface of the coupling member and said indentations of its rear surface.

WILLIAM A. BRUNO.